(12) United States Patent
Oliver

(10) Patent No.: US 10,653,258 B1
(45) Date of Patent: May 19, 2020

(54) GARMENT CHECK SYSTEM

(71) Applicant: Paul D. Oliver, Vancouver (CA)

(72) Inventor: Paul D. Oliver, Vancouver (CA)

( * ) Notice: Subject to any disclaimer, the term of this patent is extended or adjusted under 35 U.S.C. 154(b) by 0 days.

(21) Appl. No.: 16/449,433

(22) Filed: Jun. 23, 2019

(51) Int. Cl.
*A47G 25/14* (2006.01)

(52) U.S. Cl.
CPC ................. *A47G 25/1428* (2013.01)

(58) Field of Classification Search
CPC ............ A47G 25/1428; A47G 25/1407; A47G 25/1414; A47G 25/1421; A47G 25/1435
See application file for complete search history.

(56) References Cited

U.S. PATENT DOCUMENTS

| | | | | |
|---|---|---|---|---|
| 5,069,373 A | * | 12/1991 | Kolton | A47G 25/48 223/85 |
| 5,381,938 A | * | 1/1995 | Vasudeva | A47G 25/1407 223/85 |
| 5,499,466 A | * | 3/1996 | House | A47G 25/1428 40/322 |
| 2005/0067446 A1 | * | 3/2005 | Wiebe | A47G 25/1407 223/92 |
| 2006/0006301 A1 | * | 1/2006 | Turi | G09F 23/00 248/304 |
| 2007/0194064 A1 | * | 8/2007 | Elder | A47G 25/1407 223/89 |

OTHER PUBLICATIONS

"Rapids," https://web.archive.org/web/20130704060510/https://rapidswholesale.com/coat-check-tags.html, Jul. 4, 2013 (Year: 2013).*

* cited by examiner

*Primary Examiner* — Gary C Hoge

(57) ABSTRACT

A garment check system having a plurality of garment check hangers and a plurality of customer indicia components. Each of the plurality of garment check hangers include a hanger indicia component configured to display a unique identifier. Each of the plurality of customer indicia components are configured to display the unique identifier associated with a different one of the plurality of garment check hangers.

5 Claims, 2 Drawing Sheets

GARMENT CHECK SYSTEM

REFERENCE TO PENDING APPLICATIONS

This application does not claim the benefit of any pending application.

BACKGROUND OF THE INVENTION

Field of the Invention

The present invention is generally directed toward a garment check system, more specifically toward a garment check system having a hanger unified with an identifying indicia.

Description of the Related Art

Garment check systems are known in the prior art. The typical coat check system includes a two-part paper system, where a first piece of paper having a numbered indicia, i.e. numbers 1, 2, 3, printed on a piece of paper and attached to a hanger, along with a corresponding second piece of paper having the same identifying indicia that is given to the customer. When the customer returns to claim the garment, the two pieces of paper are matched up based on the indicia in order for the correct piece of clothing to be retrieved and provided back to the customer. Deficiencies with the systems include the loss, tearing or destruction of one or both pieces of paper.

As such, there is a need for a coat check system that addresses the above-mentioned deficiencies.

SUMMARY OF THE INVENTION

In one aspect of the present invention, a garment check system includes a plurality of garment check hangers and a plurality of customer indicia components. Each of the plurality of garment check hangers include a hanger indicia component configured to display a unique identifier. Each of the plurality of customer indicia components are configured to display the unique identifier associated with a different one of the plurality of garment check hangers.

In some aspects, the unique identifier is one or more numbers, one or more letters or a combination of one or more numbers and one or more letters. Further, the unique identifier may be permanently or removably affixed to the customer indicia component.

In some aspects, the garment check hanger includes two support shoulders and a horizontal support bar. Each support shoulders includes an upper end and a lower end with the upper ends of the two support shoulders being in communication at an apex. The horizontal support bar extends between the lower ends of the two support shoulders such that the two support shoulders and the horizontal support bar forming a substantial triangular configuration. The garment check hanger further includes a securing hook having a neck portion being connected to the apex of the two support shoulders and a hook portion extending away from the neck portion. The neck portion further includes the hanger indicia component.

The features of the invention which are believed to be novel are particularly pointed out in the specification. The present invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

BRIEF DESCRIPTION OF THE DRAWINGS

Various embodiments in accordance with the present disclosure will be describe with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Figure 1:
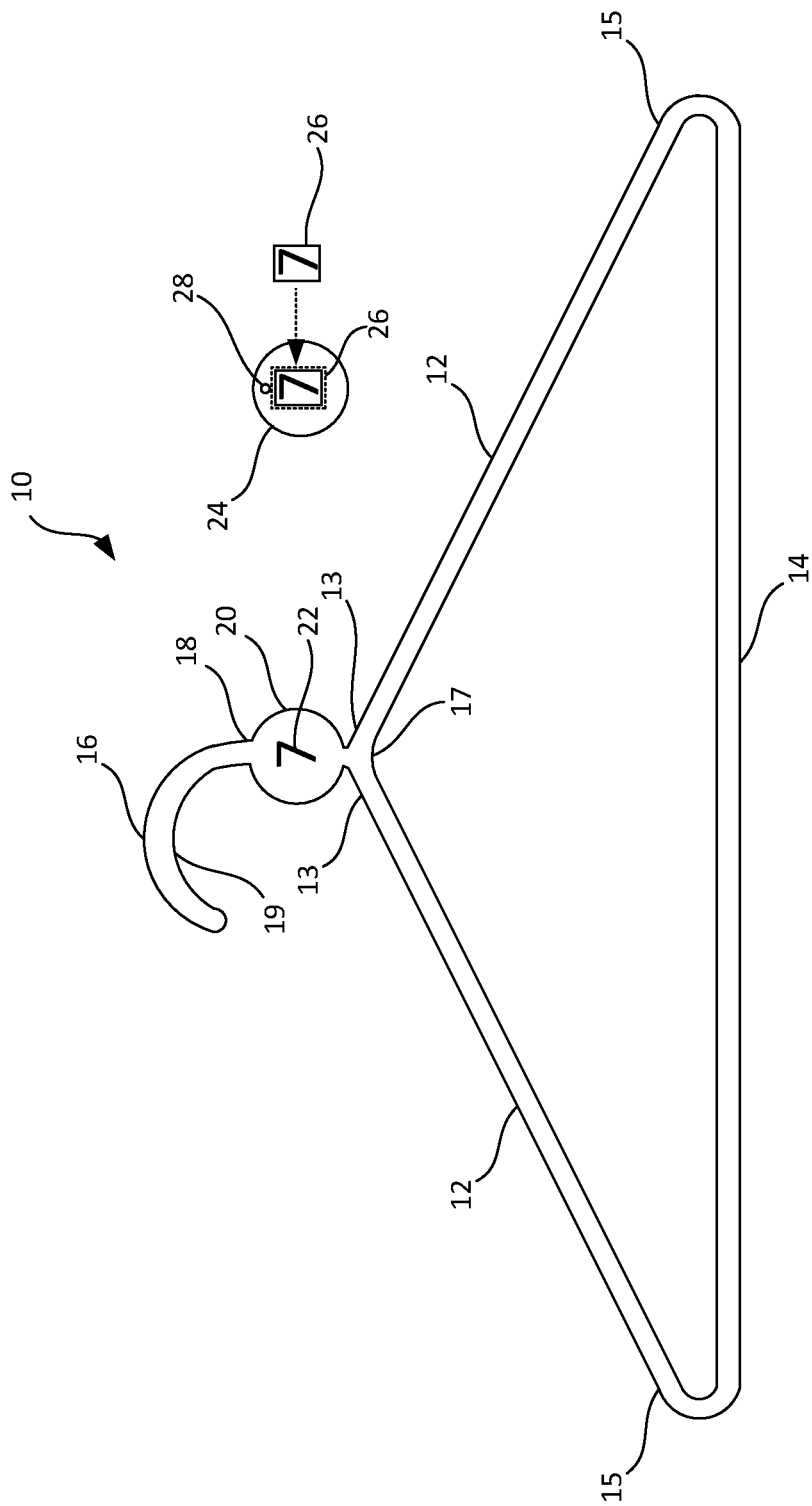
FIG. 1 is a perspective view of an embodiment of the present invention with the customer indicia component removed from a garment check hanger.
Figure 2:
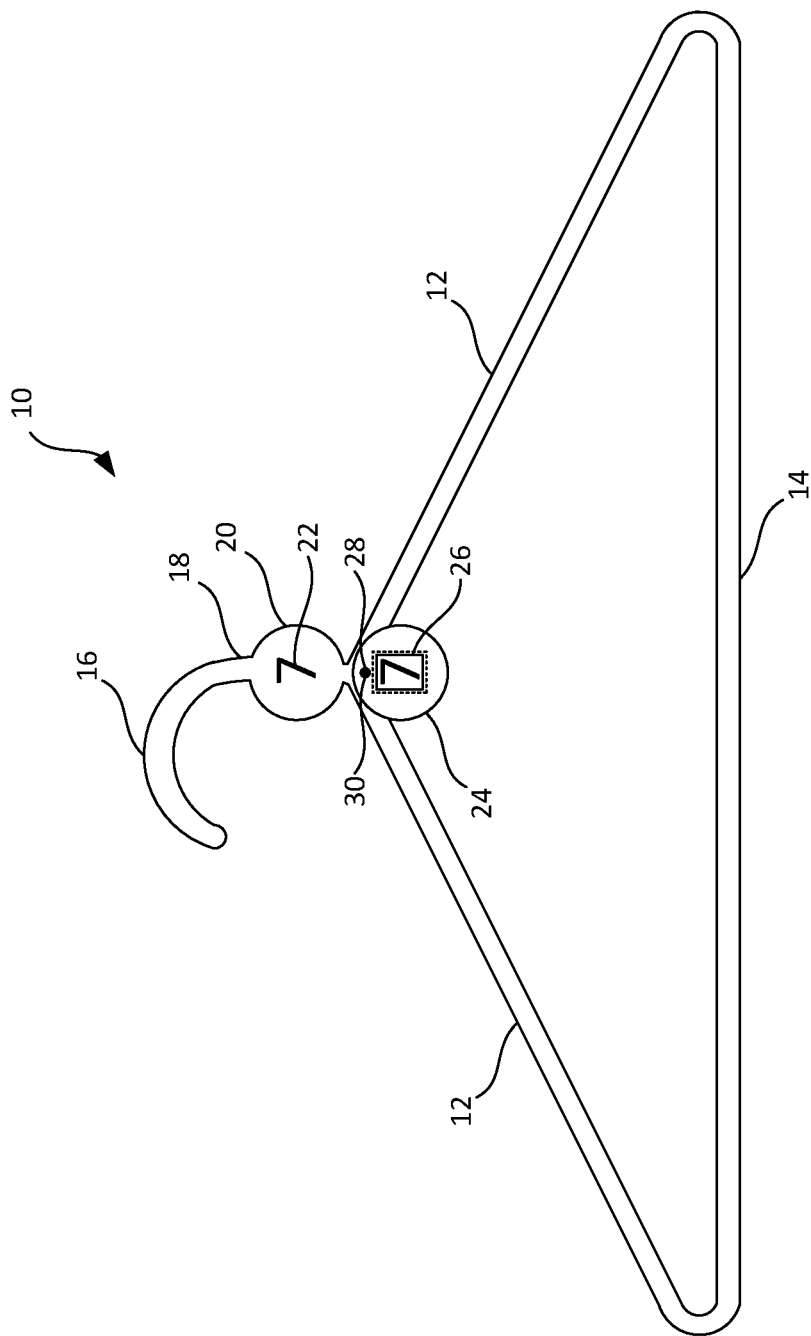
FIG. 2 is a perspective view of an embodiment of the present invention with the customer indicia component affixed to a garment check hanger.

Embodiments herein are directed to a garment check system having a plurality of hangers where each hanger has identifying indicia thereon, and a plurality of customer indicia components also having identifying indicia thereon. Referring now to the drawings in which like-referenced numerals and/or names may refer to like elements, FIGS. 1-2 illustrates an embodiment of one of a plurality of garment check hangers 10 having a hanger indicia component 20 and an embodiment of the one of the customer indicia components 24.

In some embodiments, each of the hangers 10 include two support shoulders 12 and a horizontal support bar 14. Each support shoulder 12 includes an upper end 13 and a lower end 15. The upper end 13 of the two support shoulders 12 are in communication with the each other at an apex 17. The horizontal support bar 14 extends between the lower ends 15 of the two support shoulders 12 such that the two support shoulders 12 and the horizontal support bar 14 form a substantial triangular configuration.

Hanger 10 further includes a securing hook 16 having a neck portion 18 being connected to the apex 17 of the two support shoulders 12 and a hook portion 19 extending away from the neck portion 18. The neck portion 18 has the hanger indicia component 20 located thereon. In this embodiment, the hanger indicia component 20 is disclosed as being in a round configuration. This is illustrative and not meant to be limiting. Those skilled in the art will recognize that the hanger indicia component 20 may be in any configuration, including rectangular, and are within the scope of the present invention.

In some embodiments, each of the customer indicia components 24 may be configured to display the unique identifier 26 associated with a different one of the plurality of garment check hangers 10. The unique identifier 26 may be any visual, including one or more numbers, one or more letters, one or more images, and/or a combination thereof.

Further, the unique identifier 26 may be permanently or temporarily affixed by way of a sticker, removable sticker, removable ink, or other such type of indicia, to the customer indicia component 24.

In some embodiments, as illustrated in FIG. 2, the customer indicia component 24 may be removably affixed to one of the plurality of the garment check hangers 12. In these embodiments, the customer indicia component 24 may have an opening 28 that is configured to removably engage a component hook 30 located on the hanger 10.

In operation, the hangers 10 and the customer indicia components 24 may be numerically sequenced, i.e. 1 to 100, A1 through Z9, etc. When a customer presents a garment to be checked, a hanger 10 having a customer indicia component 24 affixed thereto is selected. The unique identifier 26 on both the hanger 10 and customer indicia component 24 is the same.

The customer indicia component 24 is removed from the hanger 10 and given over to the customer. The garment is then hung on the hanger 10 and put away for storage. When the customer returns for the garment, the customer presents the customer indicia component 24 to the attendant in order to retrieve the garment.

Due to both the hanger 10 and customer indicia component 24 being constructed from durable material, such as a plastic material, and having the unique identifier 26 located thereon, the likelihood the customer indicia component 24 being inadvertently lost or damaged is low.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

I claim:

1. A garment check system comprising:
    a plurality of garment check hangers, each of the plurality of garment check hangers having a hanger indicia component configured to display a unique identifier; and
    a plurality of customer indicia components, each of the plurality of customer indicia components configured to display the unique identifier associated with a different one of the plurality of garment check hangers, wherein the unique identifier is temporarily affixed to the customer indicia component.

2. The garment check system of claim 1, wherein each of the plurality of garment check hangers comprising:
    two support shoulders, each support shoulders having an upper end and a lower end, the upper ends of the two support shoulders being in communication at an apex;
    a horizontal support bar extending between the lower ends of the two support shoulders such that the two support shoulders and the horizontal support bar forming a substantial triangular configuration; and
    a securing hook having a neck portion being connected to the apex of the two support shoulders and a hook portion extending away from the neck portion, the neck portion having the hanger indicia component.

3. The garment check system of claim 1, wherein the unique identifier is one or more numbers, one or more letters or a combination of one or more numbers and one or more letters.

4. The garment check system of claim 1, wherein the unique identifier is permanently affixed to the customer indicia component.

5. The garment check system of claim 1, wherein the plurality of the customer indicia components are removably affixed to the plurality of the garment check hangers.

* * * * *